United States Patent
Shigemizu et al.

(10) Patent No.: US 8,901,893 B2
(45) Date of Patent: Dec. 2, 2014

(54) ELECTRICITY STORAGE DEVICE AND HYBRID DISTRIBUTED POWER SUPPLY SYSTEM

(75) Inventors: Tetsuro Shigemizu, Nagasaki (JP);
Takehiko Nishida, Nagasaki (JP);
Katsuaki Kobayashi, Nagasaki (JP);
Hidehiko Tajima, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 799 days.

(21) Appl. No.: 12/377,138

(22) PCT Filed: Dec. 18, 2007

(86) PCT No.: PCT/JP2007/074299
§ 371 (c)(1),
(2), (4) Date: Jun. 2, 2009

(87) PCT Pub. No.: WO2008/075674
PCT Pub. Date: Jun. 26, 2008

(65) Prior Publication Data
US 2010/0176765 A1    Jul. 15, 2010

(30) Foreign Application Priority Data

Dec. 18, 2006  (JP) .................................. 2006-339493

(51) Int. Cl.
*H02J 7/00* (2006.01)
*H02J 3/32* (2006.01)
*H02J 7/35* (2006.01)

(52) U.S. Cl.
CPC ... *H02J 3/32* (2013.01); *H02J 7/35* (2013.01); *H02J 7/0073* (2013.01)
USPC .......................................... 320/134; 320/136

(58) Field of Classification Search
USPC ................................................. 320/101, 102
See application file for complete search history.

(56) References Cited

U.S. PATENT DOCUMENTS

| 4,839,574 A | 6/1989 | Takabayashi |
| 5,773,956 A * | 6/1998 | Wieczorek .................... 320/152 |

(Continued)

FOREIGN PATENT DOCUMENTS

| JP | 63-276877 A | 11/1988 |
| JP | 2001-327080 A | 11/2001 |

(Continued)

OTHER PUBLICATIONS

International Search Report of PCT/JP2007/074299, date of mailing Mar. 4, 2008.

(Continued)

*Primary Examiner* — Drew A Dunn
*Assistant Examiner* — Robert Grant
(74) *Attorney, Agent, or Firm* — Westerman, Hattori, Daniels & Adrian, LLP

(57) ABSTRACT

It is an object to effectively output electrical energy of a storage battery to an electrical power system serving as a whole distributed power supply system by effectively utilizing the electrical energy within a charging ratio range that does not cause overcharging or overdischarging of the storage battery. In a hybrid distributed power supply system, the target supply electrical power is set based on the electrical power generation output of the electrical power generator and the charging state of the storage battery, and the target supply electrical power is restricted within a predetermined permissible supply electrical power range when the target supply electrical power deviates from the predetermined permissible supply electrical power range.

10 Claims, 7 Drawing Sheets

(56) References Cited

U.S. PATENT DOCUMENTS

| | | | |
|---|---|---|---|
| 6,462,507 B2 * | 10/2002 | Fisher, Jr. | 320/101 |
| 7,042,195 B2 * | 5/2006 | Tsunetsugu et al. | 320/101 |
| 2004/0151011 A1 * | 8/2004 | Toyomura et al. | 363/146 |

FOREIGN PATENT DOCUMENTS

| | | | |
|---|---|---|---|
| JP | 2003-244841 A | 8/2003 |
| JP | 2004-064814 A | 2/2004 |
| JP | 2005-245183 A | 9/2005 |
| JP | 2006-141093 A | 6/2006 |
| JP | 2006-287998 A | 10/2006 |

OTHER PUBLICATIONS

Korean Office Action dated Sep. 17, 2010, issued in corresponding Korean Patent Application No. 2009-7003297.

* cited by examiner

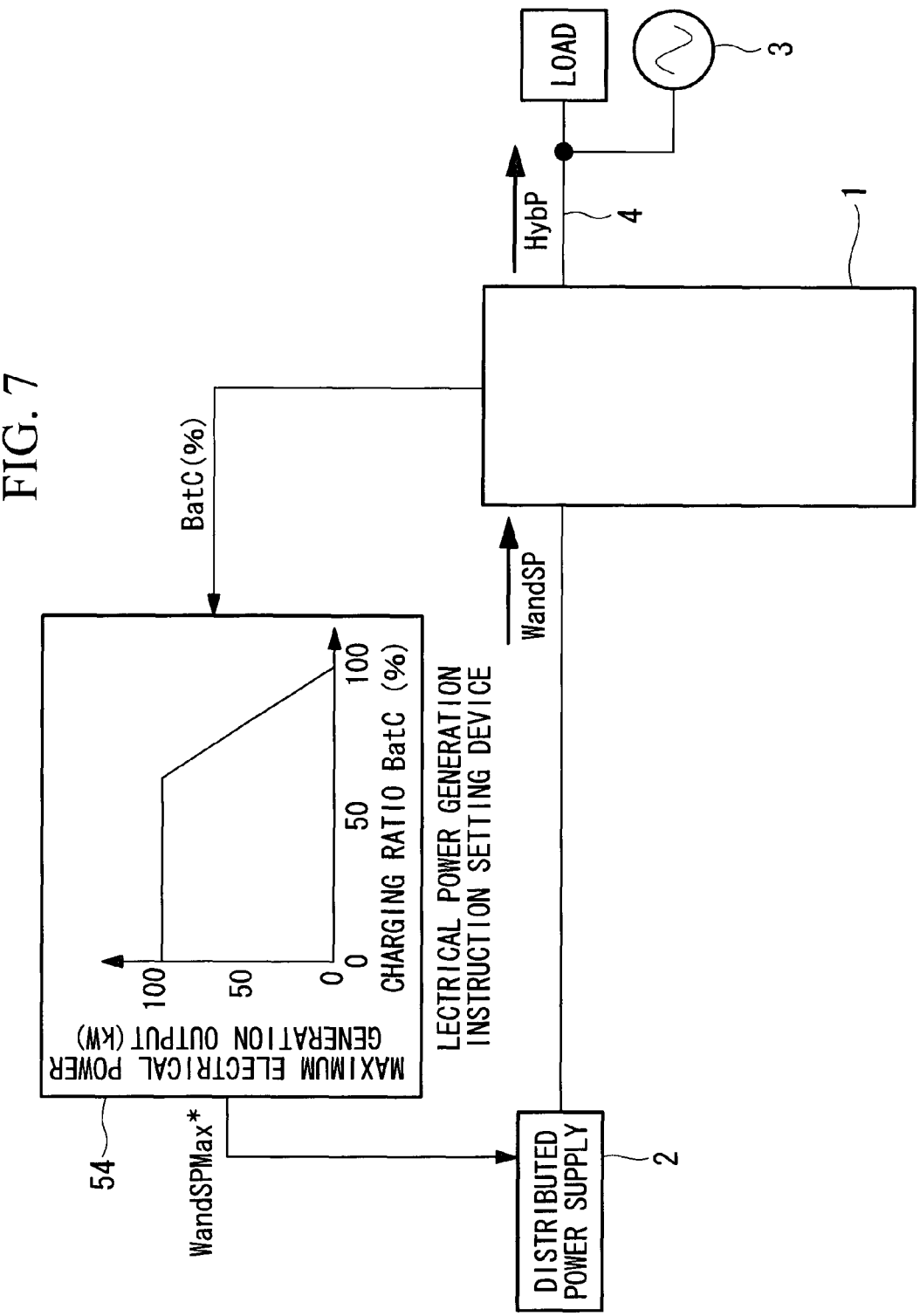

ELECTRICITY STORAGE DEVICE AND HYBRID DISTRIBUTED POWER SUPPLY SYSTEM

TECHNICAL FIELD

The present invention relates to an electricity storage device that is used in a combination with an electrical power generator using natural energy for generating electricity and that supplies the power to an electrical power system so as to reduce the output fluctuation of the electrical power generator.

BACKGROUND ART

Electrical power generators utilizing natural energy, such as wind turbine generators or photovoltaic units, have attracted attention because of the global environmental problem. However, since their output is highly influenced by weather conditions, it is difficult to generate electricity in response to demand. In addition, since the system voltage and frequency vary depending on the output fluctuation, the level of adoption of such generators is limited due to restrictions in system operation.

In order to solve these problems, recently, hybrid distributed power supply systems have been developed where electrical power generators utilizing natural energy, such as those described above, and electricity storage devices, such as secondary cells, are combined to compensate for the output fluctuation of the electrical power generators with the electricity storage devices, which allows high-quality electrical power to be supplied.

The electricity storage device used in such a hybrid distributed power supply system is described in, for example, Japanese Unexamined Patent Application, Publication No. 2001-327080 (Patent Document 1).

Patent Document 1 discloses a technology where, in order to suppress the fluctuation in output from a distributed power supply to an electrical power system, a target output value is set according to the amount of storage power of an electricity storage device, and an electrical power regulator is controlled so that the output to the power system reaches the output target value.

Patent Document 1: Japanese Unexamined Patent Application, Publication No. 2001-327080

DISCLOSURE OF INVENTION

In the electricity storage device disclosed in Patent Document 1, the target value of the output supplied to the electrical power system is determined according to the amount of charge in the electricity storage device, and then the target output value and the output of the electrical power generator are compared to determine the output indicator value of the electricity storage device.

Therefore, the target output value of a hybrid distributed power supply system is determined according to the amount of charge in a storage battery, which causes a disadvantage in that the purpose of protecting the battery cells of the storage battery is given priority over the main purpose of supplying stable electricity by suppressing output fluctuations in the distributed power supply at the upstream side.

Conversely, when the charging ratio of the storage battery is high, it is preferable to permit as high an output fluctuation of the distributed power supply as possible and to provide a large amount of electricity from the storage battery. However, such control is difficult in the above-mentioned electricity storage device.

The present invention has been made for solving the above-mentioned problems, and it is an object thereof to provide an electricity storage device and a distributed power supply system that can effectively conduct the output to an electrical power system serving as the whole distributed power supply system, while effectively utilizing the electrical energy in the storage battery within a charging ratio range that does not cause overcharging or overdischarging of the storage battery by controlling the electricity supply to the system so as to be given priority over the storage battery protection function.

The present invention employs the following solutions for solving the above-mentioned problems.

A first aspect of the present invention relates to an electricity storage device being connected between an electrical power generator using natural energy for generating electricity and an electrical power system to which the electricity of the electrical power generator is supplied and supplying electricity to the electrical power system, including a storage battery, a controller, and an electrical power inverter performing charging and discharging of the storage battery based on an inverter electrical power instruction issued by the controller, wherein the controller includes a first setting portion setting a target supply electrical power based on the electrical power generation output of the electrical power generator and the charging state of the storage battery and, when a fluctuation rate deviates from a predetermined permissible electrical power fluctuation rate range, restricting the fluctuation rate of the target supply electrical power within the permissible electrical power fluctuation rate range; and a second setting portion setting the inverter target electrical power based on the target supply electrical power, wherein the permissible electrical power fluctuation rate range is changed according to time, load, environment, or the charging ratio of the storage battery.

In such a configuration, since the target supply electrical power is set based on the electrical power generation output of the electrical power generator and the charging state of the storage battery, the target supply electrical power that can maximally extract the electricity charged in the storage battery can be obtained. In this case, if the fluctuation rate of the target supply electrical power deviates from a predetermined permissible electrical power fluctuation rate range, the target supply electrical power is restricted within the permissible electrical power fluctuation rate range. Thus, the target supply electrical power is controlled within a suitable range, which restricts the output fluctuation within the permissible range.

Furthermore, since the permissible electrical power fluctuation rate range is changed according to time, load, environment, or charging ratio of the storage battery, the target supply electrical power can be set so as to be suitable for the electricity consumption condition at the current time by determining a suitable permissible electrical power fluctuation rate range according to the electricity demand at that time. For example, when the electricity demand is high, the electricity supply from the storage battery is given priority by setting the permissible electrical power fluctuation rate high. On the other hand, when the electricity demand is low, the charging ratio of the storage battery is preferentially ensured by setting the permissible electrical power fluctuation rate low.

Accordingly, the electricity charged in the storage battery can be effectively used, and effective electricity supply according to demand can be achieved.

A second aspect of the present invention relates to an electricity storage device being connected between an electrical power generator using natural energy for generating electricity and an electrical power system to which the electricity of the electrical power generator is supplied and supplying electricity to the electrical power system, including a storage battery, a controller, and an electrical power inverter performing charging and discharging of the storage battery based on an inverter electrical power instruction issued by the controller, wherein the controller includes a first setting portion setting a target supply electrical power based on the electrical power generation output of the electrical power generator and the charging state of the storage battery and, when the target supply electrical power deviates from a predetermined permissible supply electrical power range, restricting the target supply electrical power within the predetermined permissible supply electrical power range; and a second setting portion setting the inverter target electrical power based on the target supply electrical power, wherein the permissible supply electrical power range is changed according to time, load, environment, or the charging ratio of the storage battery.

In such a configuration, since the target supply electrical power is set based on the electrical power generation output of the electrical power generator and the charging state of the storage battery, the target supply electrical power that can maximally extract the electricity charged in the storage battery can be obtained. In this case, if the target supply electrical power deviates from a predetermined permissible supply electrical power range, the target supply electrical power is restricted within the permissible electrical power range. Thus, the target supply electrical power is controlled within a suitable range, which restricts the output fluctuation within the permissible range.

Furthermore, since the permissible electrical power range is changed according to time, load, environment, or charging ratio of the storage battery, a target supply electrical power suitable for the electricity consumption state can be set by determining a suitable permissible electrical power range according to the electricity demand at that time.

Accordingly, the electricity charged in the storage battery can be effectively used, and effective electricity supply according to demand can be achieved.

In the above-mentioned electricity storage device, the first setting portion may be configured to set the target supply electrical power by using a charging-ratio-maintaining instruction for bringing the charging ratio of the storage battery close to the target charging ratio, and the target charging ratio is changed according to time, load, or environment.

In such a configuration, since the target charging ratio is changed according to time, load, or environment, electricity supply according to electricity demand can be achieved.

In the above-mentioned electricity storage device, it may be configured such that the charging-ratio-maintaining instruction is obtained by PID control of the difference between the charging ratio of the storage battery and the target charging ratio and that at least one control constant used in the PID control is changed according to the charging ratio of the storage battery.

Thus, if the charging ratio of the storage battery is decreased by changing at least one control constant of the PID control according to the charging ratio of the storage battery and thereby, for example, the operation of a hybrid distributed power supply system may be halted, halting of the system can be prevented before it occurs by changing the control such that the charging ratio maintenance is given priority by setting the proportional gain high.

A third aspect of the present invention relates to a hybrid distributed power supply system including the above-mentioned electricity storage device and an electrical power generator using natural energy for generating electricity.

A fourth aspect of the present invention relates to a hybrid distributed power supply system including an electrical power generator using natural energy for generating electricity; an electricity storage device that is connected between the electrical power generator and an electrical power system to which the electricity of the electrical power generator is supplied and supplies electricity to the electrical power system; an electrical power generation instruction setting device setting the maximum electrical power generation output of the electrical power generator based on the charging ratio of a storage battery provided in the electricity storage device; and an electrical power generation controlling device controlling the electrical power generator based on the maximum electrical power generation output of the storage battery.

Thus, the maximum electrical power generation output of the electrical power generator is set according to the charging ratio of a storage battery provided in the electricity storage device, and thereby, for example, in the case that the charging ratio of the storage battery is high, the electricity of the storage battery can be effectively used by setting the maximum electrical power generation output of the electrical power generator low.

A fifth aspect of the present invention relates to a method for controlling charging and discharging of an electricity storage device including a storage battery and an electrical power inverter performing charging and discharging of the storage battery based on an inverter electrical power instruction, being connected between an electrical power generator using natural energy for generating electricity and an electrical power system to which the electricity of the electrical power generator is supplied, and supplying electricity to the electrical power system from the storage battery. The method includes a first setting step of setting a target supply electrical power based on the electrical power generation output of the electrical power generator and the charging state of the storage battery and, when a fluctuation rate deviates from a predetermined permissible electrical power fluctuation rate range, restricting the fluctuation rate of the target supply electrical power within the permissible electrical power fluctuation rate range; and a second setting step setting of the inverter target electrical power based on the target supply electrical power, wherein the permissible electrical power fluctuation rate range is changed according to time, load, environment, or the charging ratio of the storage battery.

A sixth aspect of the present invention relates to a method for controlling charging and discharging of an electricity storage device including a storage battery and an electrical power inverter performing charging and discharging of the storage battery based on an inverter electrical power instruction, being connected between an electrical power generator using natural energy for generating electricity and an electrical power system to which the electricity of the electrical power generator is supplied, and being capable of supplying electricity to the electrical power system from the storage battery. The method includes a first setting step of setting a target supply electrical power based on the electrical power generation output of the electrical power generator and the charging state of the storage battery and, when the target supply electrical power deviates from a predetermined permissible supply electrical power range, restricting the target supply electrical power within the predetermined permissible supply electrical power range; and a second setting step of setting the inverter target electrical power based on the target supply electrical power, wherein the permissible supply electrical power range changes according to time, load, environment, or the charging ratio of the storage battery.

In the present invention, since electricity supply to the system is controlled with priority over the purpose of protecting the storage battery, there is an advantageous effect in that the electrical energy in the storage battery can be effectively utilized within a range that does not cause overcharging or overdischarging of the storage battery.

BRIEF DESCRIPTION OF DRAWINGS

FIG. 7 is a diagram illustrating an electricity storage device having an electrical power generation instruction setting device.

EXPLANATION OF REFERENCE SIGNS

Figure 1:
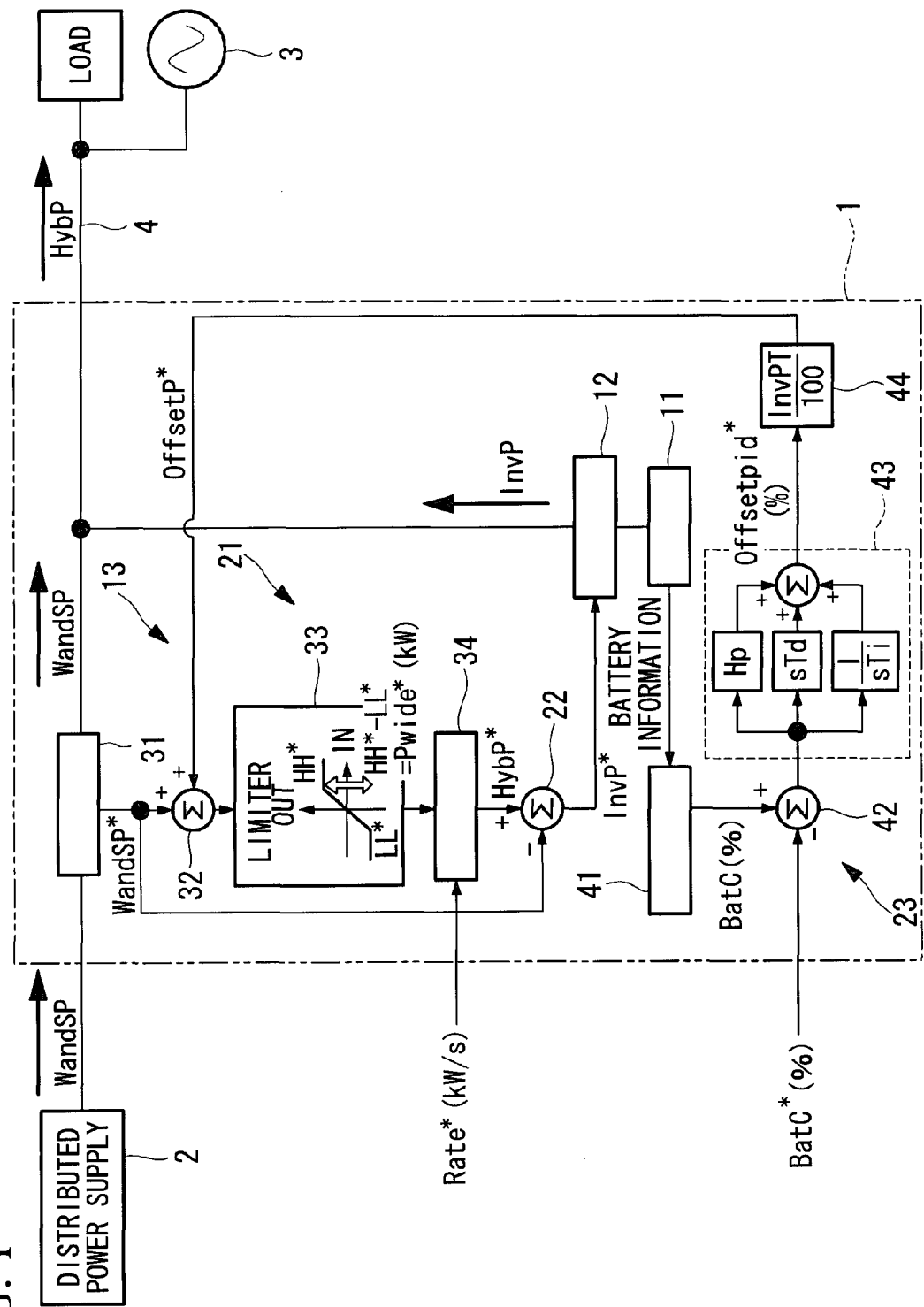
FIG. 1 is a schematic configuration diagram of a hybrid distributed power supply system that employs an electricity storage device according to an embodiment of the present invention.

1: electricity storage device
2: distributed power supply
11: storage battery
12: electrical power inverter
13: controller
21: first setting portion
22: second setting portion
23: third setting portion
31: electricity detector
32: accumulator
33: limiter
34: smoothing circuit
41: charging ratio computing portion
42: subtracter
43: PID controller
44: computing device
50, 50': permissible electrical power fluctuation rate setting device
51: permissible supply electrical power range setting device
52: target charging ratio setting device
53: PID control constant setting device
54: electrical power generation instruction setting device

BEST MODE FOR CARRYING OUT THE INVENTION

An embodiment of the electricity storage device and the hybrid distributed power supply system according to the present invention will be described below with reference to the drawings.

FIG. 1 is a schematic configuration diagram of a hybrid distributed power supply system that employs an electricity storage device according to an embodiment of the present invention.

As shown in this diagram, the hybrid distributed power supply system is configured to have a distributed power supply 2 and an electricity storage device 1. The hybrid distributed power supply system is connected to a power supply line 4 for a power supply 3 via a transformer for interconnecting systems (not shown). The power supply 3 herein is, for example, a power supply of an electrical power plant of a power company, a small independent power supply such as a diesel generator on, for example, a remote island, or a private electric generator power supply in a consumer's home.

In the hybrid distributed power supply system, the distributed power supply 2 is a power supply whose output varies depending on the natural environment, such as a wind turbine generator or a photovoltaic unit.

The electricity storage device 1 includes a storage battery 11 for storing electricity, an electrical power inverter 12 for controlling charging and discharging of the storage battery 11, and a controller 13.

The storage battery 11 stores electricity and is, for example, a lithium ion battery or an electric double layer storage battery. The storage battery 11 is connected to an electrical power system line that connects the distributed power supply 2 and the power supply line 4, via the electrical power inverter 12.

The electrical power inverter 12 has a function of transmitting electricity from the storage battery 11 to the power supply line 4 and a function of transmitting electricity from the power supply line 4 or the distributed power supply 2 to the storage battery 11 and performs charging and discharging of the storage battery 11 based on an inverter electrical power instruction InvP* issued by the controller 13.

The controller 13 sets a target supply electrical power HybP* based on the electrical power generation output of the distributed power supply 2 and the charging state of the storage battery 11, and has a first setting portion 21 restricting the fluctuation rate of the target supply electrical power HybP* within a predetermined permissible electrical power fluctuation rate range when the fluctuation rate deviates from the permissible electrical power fluctuation rate range and a second setting portion 22 setting the inverter electrical power based on the target supply electrical power HybP*. In addition, the controller 13 sets a charge/discharge instruction OffsetP* for bringing the charging state of the storage battery 11 close to the target charging state, and has a third setting portion 23 giving the charge/discharge instruction OffsetP* to the first setting portion 21.

The first setting portion 21 includes an electricity detector 31, an accumulator 32, a limiter 33, and a smoothing circuit 34.

The electricity detector 31 detects the output electricity of the distributed power supply 2 and outputs the detected output electricity WandSP* to the accumulator 32 and the second setting portion 22. The accumulator 32 sums the output electricity WandSP* and charging-ratio-maintaining instruction OffsetP* set by the third setting portion 23, described below, and outputs the accumulated electrical power value HybP*' (not shown) to the limiter 33. The limiter 33 restricts the accumulated electrical power value HybP*' within a predetermined permissible supply electrical power range (LL*≤HybP*'≤HH*) and outputs the restricted accumulated electrical power value HybP*' (not shown) to the smoothing circuit 34. Here, LL* represents the minimum electricity supply, the HH* represents the maximum electricity supply, and Pwide*=HH*−LL*.

The smoothing circuit 34 sets the target supply electrical power HybP* by smoothing the accumulated electrical power value HybP*' inputted from the limiter 33. At this time, the smoothing circuit 34 sets the target supply electrical power HybP* within a predetermined permissible electrical power fluctuation rate range.

Figure 2:
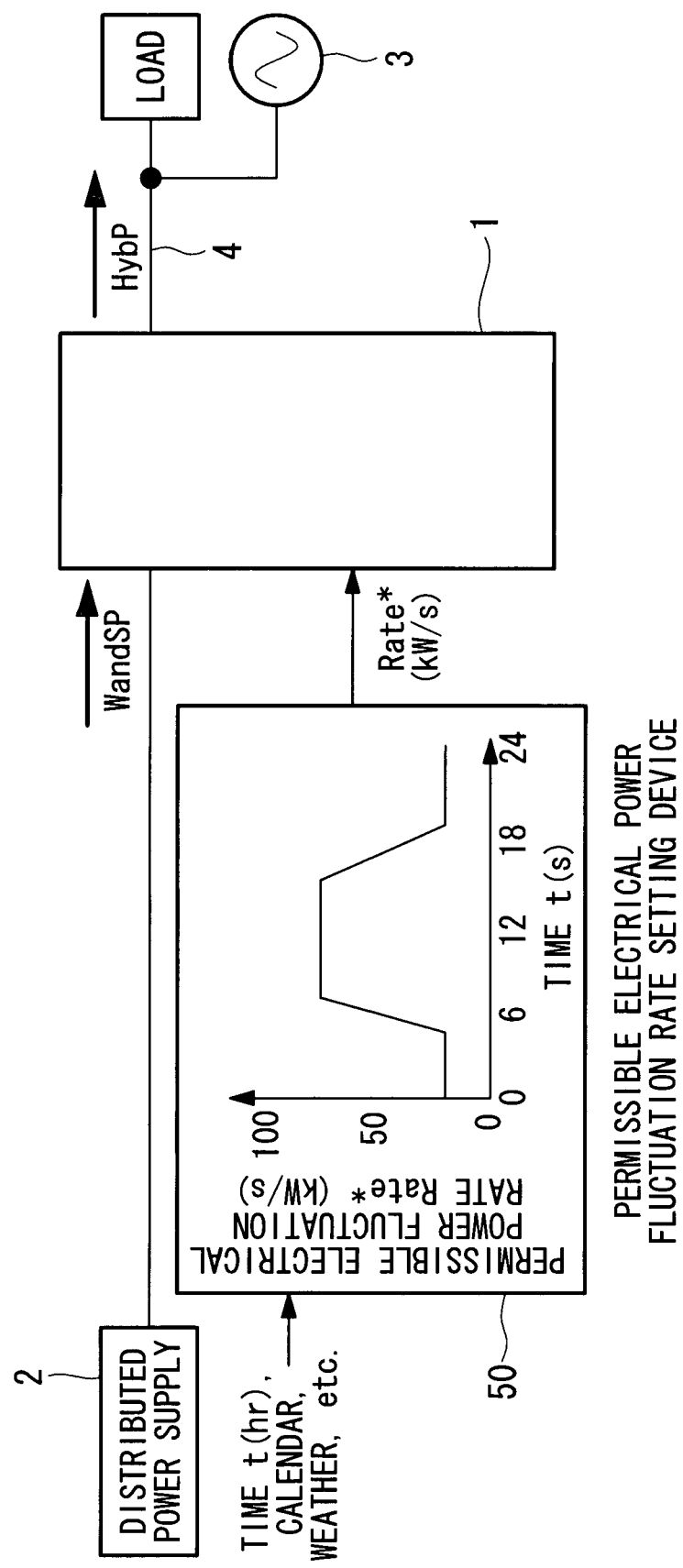
FIG. 2 is a diagram illustrating an electricity storage device having a permissible electrical power fluctuation rate setting device.

In this embodiment, the smoothing circuit 34 changes the target supply electrical power at a permissible electrical power fluctuation rate Rate* given by a permissible electrical power fluctuation rate setting device 50 shown in FIG. 2.

The permissible electrical power fluctuation rate setting device 50 will be described in detail below. The target supply electrical power HybP* is the target electrical power to be supplied to the power supply line 4. The target supply electrical power HybP* set in the smoothing circuit 34 is outputted to the second setting portion 22. Any filter may be employed as the smoothing circuit 34. At this time, when the Rate* (kW/s) is applied to a primary delay (time constant T(s)), it is necessary that the maximum fluctuation rate satisfy the following relation:

$$Rate^* = Pwide^*/T.$$

Accordingly, the time constant T is required to satisfy the following relation:

$$T = Pwide^*/Rate^*.$$

The second setting portion 22 sets the inverter electrical power instruction InvP* by subtracting the output electricity WandSP* from the target supply electrical power HybP* and outputs the inverter electrical power instruction InvP* to the electrical power inverter 12.

Accordingly, the electrical power inverter 12 achieves electricity supply from the storage battery 11 or to the storage battery 11 based on the inverter electrical power instruction InvP*.

The third setting portion 23 includes a charging-ratio-computing portion 41 for detecting the charging ratio of the storage battery 11, a subtracter 42, a PID controller 43, and a computing device 44.

The charging-ratio-computing portion 41 obtains the charging ratio BatC of the storage battery 11 by a known method and outputs this charging ratio BatC to the subtracter 42. The subtracter 42 calculates a difference between the charging ratio BatC and a previously set target charging ratio BatC* and outputs the difference to the PID controller 43. The PID controller 43 performs the PID control according to the difference and outputs the computation Offsetpid* (%) to the computing device 44. The computing device 44 outputs a charge/discharge instruction OffsetP*, which is a value obtained by multiplying the computation Offsetpid* (%) by the output electricity InvP of the electrical power inverter 12 and then dividing the resulting value by 100.

The charge/discharge instruction OffsetP* thus set by the third setting portion 23 is outputted to the accumulator 32 of the above-mentioned first setting portion 21, and the charge/discharge instruction OffsetP* is used as one parameter for setting the inverter electrical power instruction InvP*.

In integral calculation in the PID controller, as is carried out in general control, the integral operation is halted during the period when the output signal of the accumulator 32 is restricted by the limiter 33. Therefore, the integral quantity is not infinitely increased.

Next, the permissible electrical power fluctuation rate setting device 50 will be described with reference to FIG. 2.

As shown in FIG. 2, the permissible electrical power fluctuation rate setting device 50 possesses a table in which time and permissible electrical power fluctuation rate Rate* are associated with each other, obtains a permissible electrical power fluctuation rate Rate* corresponding to the current time from the table, and gives it to the smoothing circuit 34 of the controller 13.

The permissible electrical power fluctuation rate Rate* herein is a value reflecting the electricity consumption state. Specifically, the permissible electrical power fluctuation rate Rate* is set to a high level at times of high electricity consumption (for example, from 06:00 to 18:00) and is set to a low level at times of low electricity consumption (for example, from 18:00 to 06:00).

A plurality of the tables, such as that shown in FIG. 2, may be provided, i.e., daily, weekly, and seasonal ones. In addition, a plurality of tables may be provided according to environmental conditions, such as weather, or according to, for example, a load or a charging ratio of the storage battery. In such a case, the permissible electrical power fluctuation rate setting device 50 selects a table that is most suitable for the current time from the plurality of tables, obtains a permissible electrical power fluctuation rate Rate* corresponding to the current time from the selected table, and gives it to the smoothing circuit 34.

By storing a plurality of tables corresponding to a plurality of conditions, it is possible to supply electricity that is optimum with respect to the electricity demand-supply pattern.

Next, the operation of the electricity storage device 1 having the above-mentioned configuration will be briefly described.

The output electricity of the distributed power supply 2 is detected by the electricity detector 31 at predetermined time intervals. The detection value, i.e., the output electricity WandSP*, is outputted to the accumulator 32 and the second setting portion 22. The accumulator 32 sums this output electricity WandSP* and the charge/discharge instruction OffsetP* inputted from the third setting portion 23 and outputs the resulting accumulated electrical power value HybP*' (not shown) to the limiter 33.

The limiter 33 restricts the accumulated electrical power value HybP*' within a predetermined permissible range (LL*≤HybP*'≤HH*) and outputs it to the smoothing circuit 34. The smoothing circuit 34 smoothes the restricted accumulated electrical power value HybP*' and sets the target supply electrical power HybP*, which is a permissible electrical power fluctuation rate Rate* given by the permissible electrical power fluctuation rate setting device 50 shown in FIG. 2, based on the fluctuation rate at that time. The target supply electrical power HybP* is outputted to the second setting portion 22.

The second setting portion 22 sets the inverter electrical power instruction InvP* by subtracting the output electricity WandSP* from the target supply electrical power HybP* and outputs the inverter electrical power instruction InvP* to the electrical power inverter 12.

The charging state of the storage battery 11 is monitored by the third setting portion 23 concurrently with the above-mentioned process, and the charge/discharge instruction OffsetP* for maintaining the charging state within a predetermined range is determined and is sent to the accumulator 32 of the first setting portion 21. With this, the charge/discharge instruction OffsetP* set by the third setting portion 23 is used as one parameter for setting the inverter electrical power instruction InvP*.

As described above, in the electricity storage device 1 according to this embodiment, since the accumulated electrical power value HybP*' (not shown) is determined as the sum of the output electricity WandSP* of the distributed power supply 2 and the charge/discharge instruction OffsetP* reflecting the charging state of the storage battery 11, the target supply electrical power HybP* that can maximally extract the electricity charged in the storage battery 11 can be set.

Furthermore, the limiter 33 and the smoothing circuit 34 restrict the target supply electrical power HybP* within a permissible range and suppress the amount of change thereof to the permissible electrical power fluctuation rate Rate*. In this case, since the permissible electrical power fluctuation rate Rate* is a value reflecting the electricity consumption at that time, the target supply electrical power HybP* suitable for the electricity consumption conditions can be set.

With this, the electricity charged in the storage battery 11 can be effectively used, and electricity can be effectively supplied in response to demand.

Figure 3:
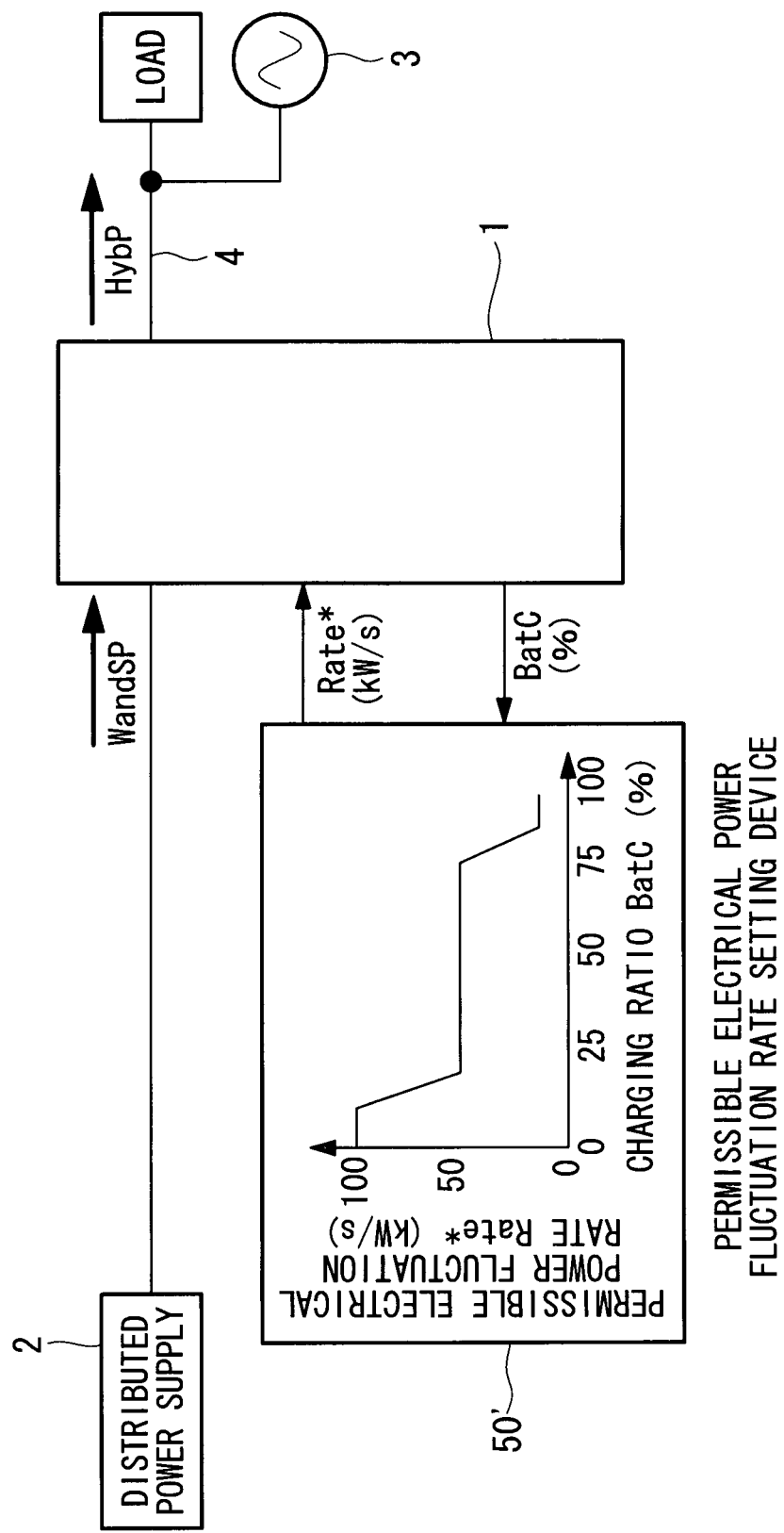
FIG. 3 is a diagram illustrating a modification of the permissible electrical power fluctuation rate setting device.

As shown in FIG. 3, the table of the above-mentioned permissible electrical power fluctuation rate Rate* may show the relationship between the permissible electrical power fluctuation rate Rate* and the charging ratio BatC. The permissible electrical power fluctuation rate setting device 50' thus changes the permissible electrical power fluctuation rate Rate* according to the charging ratio BatC, thereby maintaining the charging ratio of the storage battery by suppressing the output electrical power fluctuation in the power supply line 4 when the charging ratio BatC of the storage battery 11 is high and releasing the output electrical power fluctuation in the power supply line 4 when the charging ratio BatC is low.

Furthermore, in the case where an instruction is inputted from a power plant, it may be configured to be switchable to the instruction from the power plant.

Figure 4:
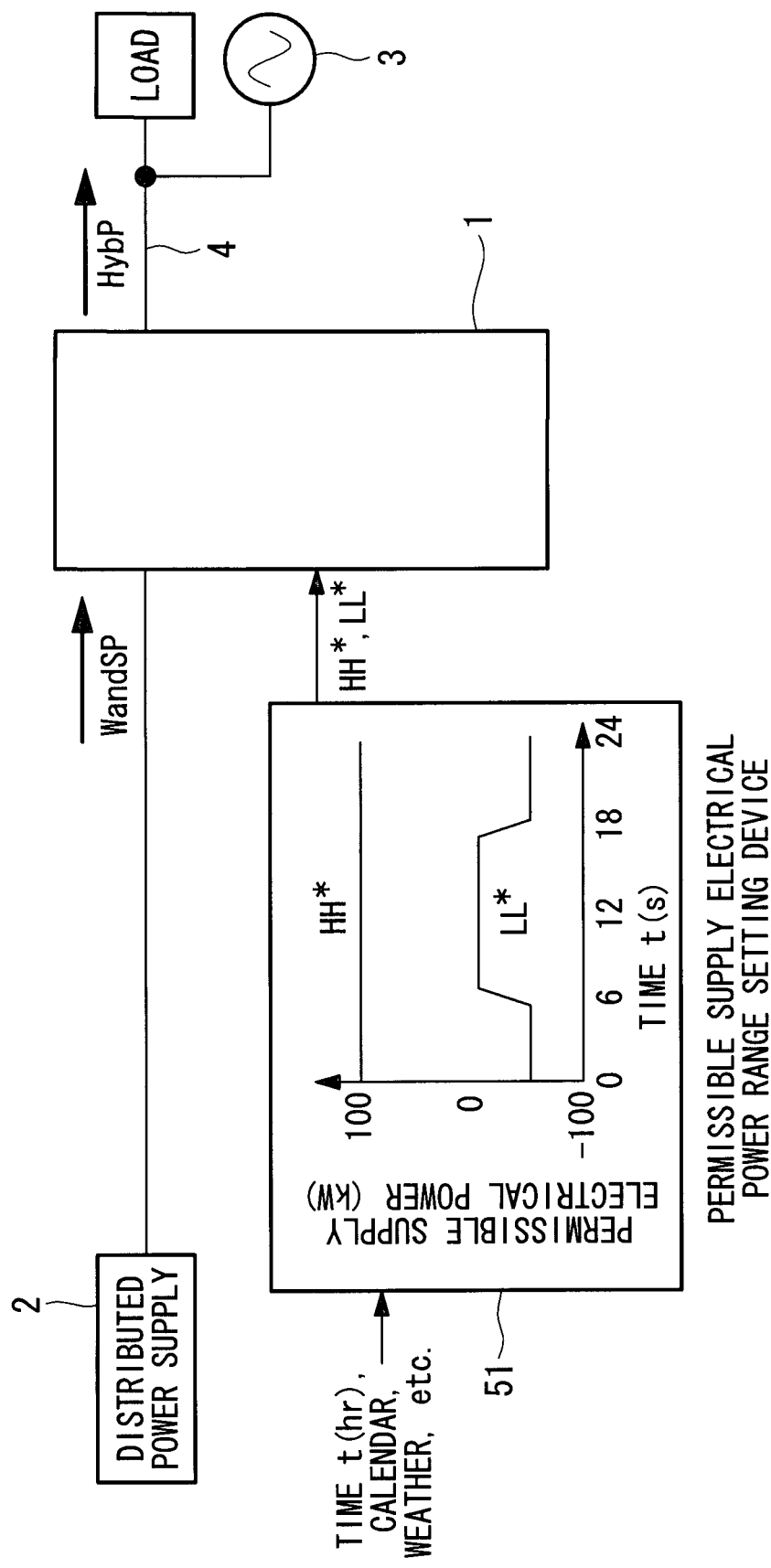
FIG. 4 is a diagram illustrating an electricity storage device having a permissible supply electrical power range setting device.

In the above embodiment, it may be configured such that the maximum electricity supply HH* and the minimum electricity supply LL* employed in the limiter 33 vary according to, for example, time. For example, as shown in FIG. 4, an supply electrical power range setting device 51 that sets the maximum electricity supply HH* and the minimum electricity supply LL* applied to the limiter 33 is provided. For example, the supply electrical power range setting device 51 possesses a table in which time and the maximum electricity supply HH* or the minimum electricity supply LL* are associated with each other, obtains the minimum electricity supply LL* and the maximum electricity supply HH* corresponding to the current time from the table, and gives them to the limiter 33 of the controller 13.

A plurality of the tables may be provided, for example, daily, weekly, and seasonal ones. In addition, a plurality of tables may be provided according to environmental conditions, such as weather, or according to, for example, a load or a charging ratio BatC of the storage battery 11.

Accordingly, electricity can be supplied so as to respond to electricity demand by varying the permissible electrical power range with time. Furthermore, the charging ratio BatC of the storage battery 11 can be maintained within a satisfactory range by setting the supply electrical power range in advance so as not to place a burden on the storage battery 11. In addition, the supply electrical power range setting device 51 possessing a plurality of tables for a plurality of conditions can supply electricity that is optimum with respect to the electricity demand pattern.

Figure 5:
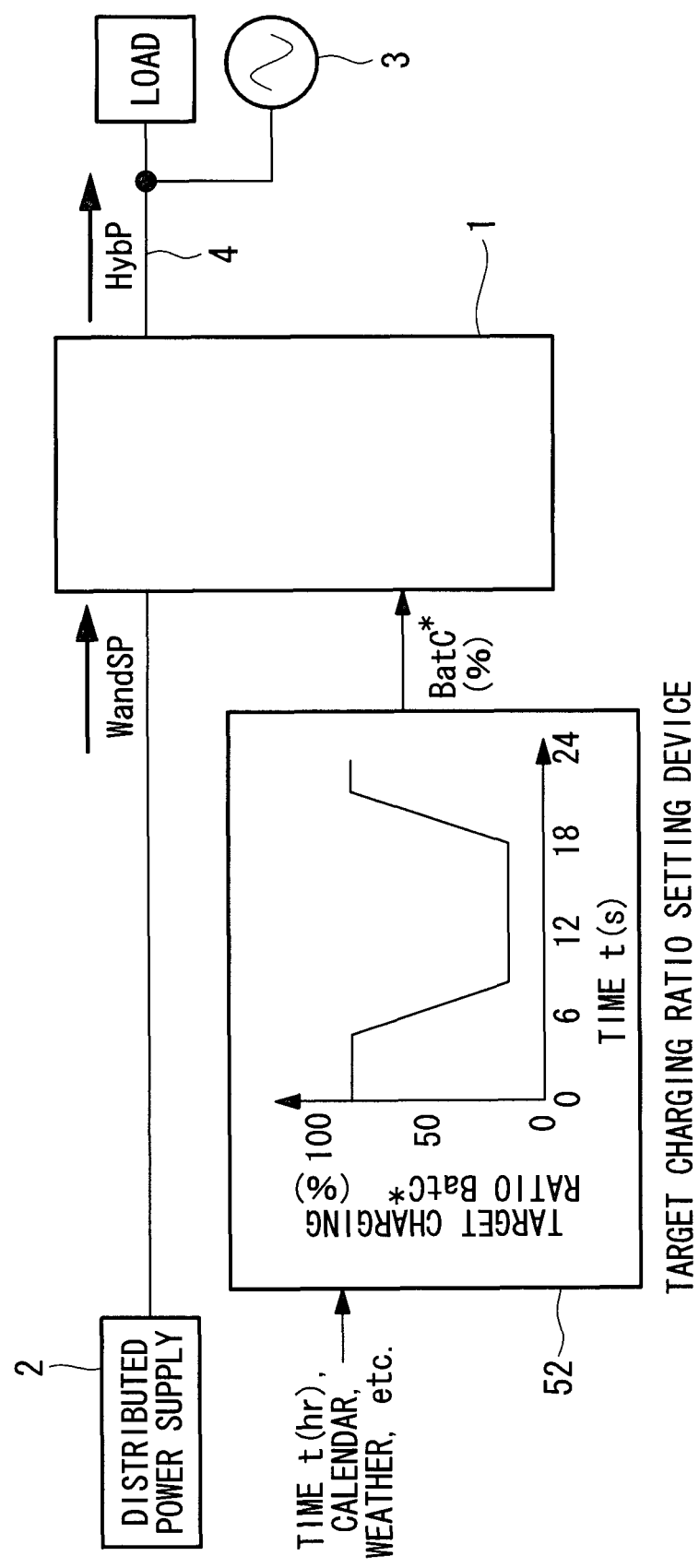
FIG. 5 is a diagram illustrating an electricity storage device having a target charging ratio setting device.

In the above embodiment, it may be configured such that the target charging ratio BatC* employed in the third setting portion 23 varies with time. For example, as shown in FIG. 5, a target charging ratio setting device 52 for setting a target charging ratio BatC* to be given to the subtracter 42 of the third setting portion 23 is provided.

The target charging ratio setting device 52 possesses a table in which, for example, time and target charging ratio BatC* are associated with each other, obtains a target charging ratio BatC* corresponding to the current time from the table, and gives it to the subtracter 42 of the third setting portion 23.

A plurality of the tables may be provided, for example, daily, weekly, and seasonal ones. In addition, a plurality of tables may be provided according to environmental conditions, such as weather, or according to, for example, a load or a charging ratio BatC of the storage battery 11.

By setting the target charging ratio BatC* according to time in this way, electricity can be supplied corresponding to electricity demand.

Figure 6:
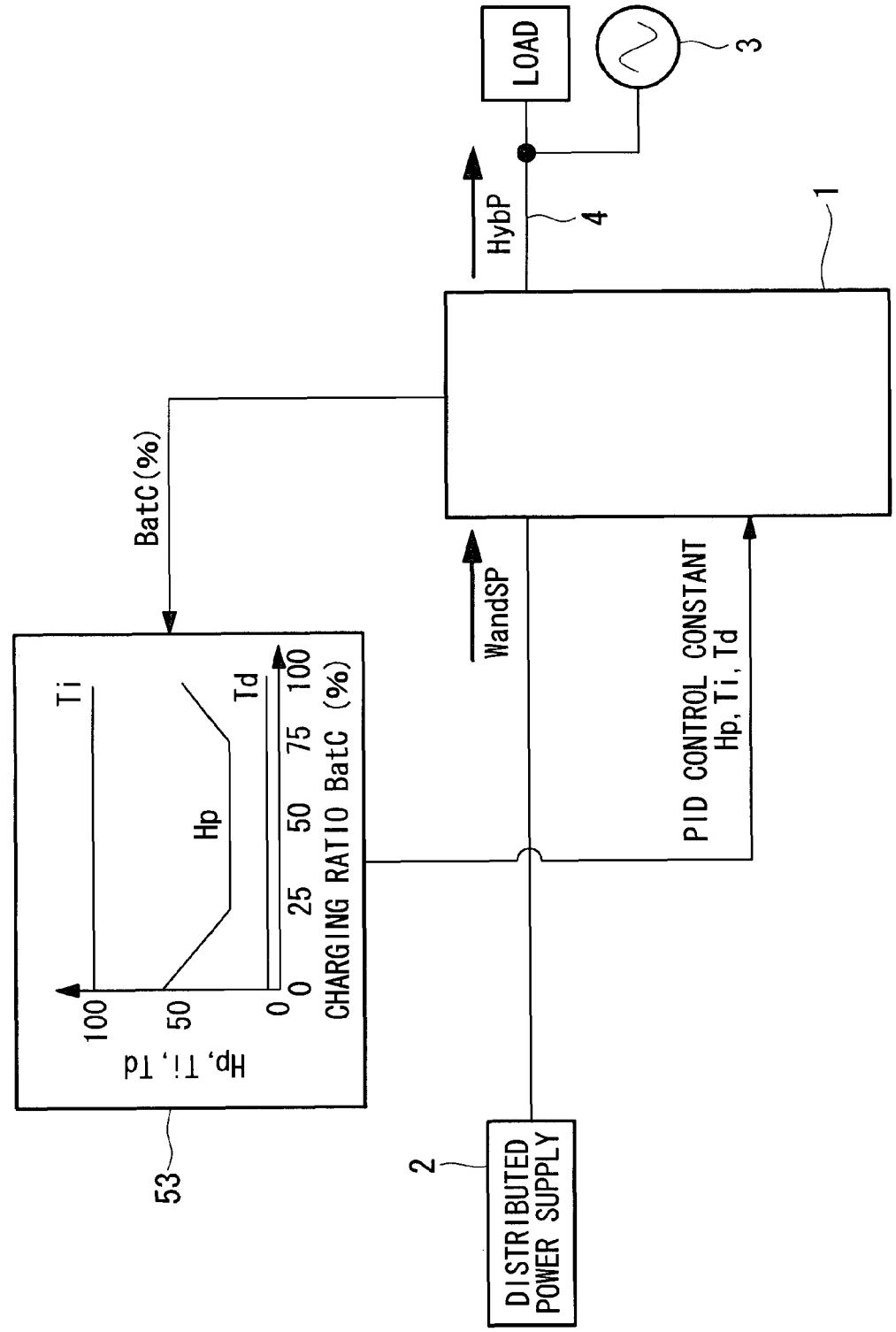
FIG. 6 is a diagram illustrating an electricity storage device having a PID control constant setting device.

In the above embodiment, the constants in PID control employed in the third setting portion 23 may be varied according to the charging ratio BatC of the storage battery 11. For example, as shown in FIG. 6, a PID control constant setting device 53 for setting control constants Hp, Ti, and Td given to the PID controller 43 of the third setting portion 23 is provided.

The PID control constant setting device 53 possesses a table in which, for example, charging ratio BatC of the storage battery 11 and each of the control constants Hp, Ti, and Td of the PID controller are associated with each other, obtains the control constants Hp, Ti, and Td corresponding to a charging ratio BatC at the current time, and gives them to the PID controller 43 of the third setting portion 23. In this table, for example, the control constant Hp of a proportional controller is set low in a high region (for example, 75% or more) and a low region (for example, 25% or less) of the charging ratio BatC. By doing so, the PID controller actively functions when the charging ratio is high or low, resulting in maintenance of the charging ratio BatC of the storage battery 11.

For example, if the charging ratio BatC of the storage battery 11 is decreased by thus setting the control constants Hp, Ti, and Td of the PID controller 43 according to the charging ratio BatC of the storage battery 11 and thereby the operation of the hybrid distributed power supply system is halted, halting of the system can be prevented before it occurs by changing the control such that charging ratio maintenance is given priority by, for example, setting the proportional gain Hp high.

A plurality of the tables may be provided, for example, daily, weekly, and seasonal ones. In addition, a plurality of tables may be provided according to environmental conditions, such as weather, or according to, for example, a load or a charging ratio BatC of the storage battery 11.

In the hybrid distributed power supply system, in addition to the changes of various control variables in the electricity storage device 1 as described above, as shown in FIG. 7, it may be configured so as to set the electrical power generation instruction of the distributed power supply 2 according to the charging ratio BatC of the storage battery 11 of the electricity storage device 1. That is, it may be configured such that the charging state of the storage battery 11 of the electricity storage device 1 is fed back to the electrical power generation control of the distributed power supply 2.

In such a case, for example, as shown in FIG. 7, an electrical power generation instruction setting device 54 for setting the maximum electrical power generation output of the distributed power supply 2 is provided.

The electrical power generation instruction setting device 54 possesses a table in which the charging ratio BatC of the storage battery 11 and the maximum electrical power generation output are associated with each other, obtains the maximum electrical power generation output corresponding to the current charging ratio BatC from the table, and gives it to an electrical power generation controller (not shown) controlling the electrical power generation of the distributed power supply 2.

In this table, for example, the maximum electrical power generation output is set high in a low charging ratio BatC region (for example, 60% or less) and is set so as to be gradually decreased with an increase in the charging ratio BatC in a high charging ratio BatC region (for example, 60% or more).

For example, if the maximum electrical power generation is set to be high when the charging ratio BatC is high, the electricity stored in the storage battery 11 cannot be effectively used. Therefore, when the charging ratio BatC of the storage battery 11 is somewhat high, the electricity stored in the storage battery 11 can be effectively used by controlling the electrical power generation level in the distributed power supply 2 to be low.

The controller 13 of the above-described electricity storage device 1 may be realized by hardware such as an analog circuit or by processing with a microcomputer. In the case where it is implemented by a microcomputer, the above-mentioned operation is achieved by storing the function for implementing each component of the controller 13 in a memory in the form of a program and executing the program read out from the memory with the CPU.

Although the embodiments of the present invention have been described in detail with reference to the drawings, the specific configuration is not limited to these embodiments, and modifications in design and other elements without departing from the scope of the present invention are also included.

For example, it is possible to employ a combination properly selected from the above-described permissible electrical power fluctuation rate setting devices 50 and 50', the permissible supply electrical power range setting device 51, the target charging ratio setting device 52, the PID control constant setting device 53, and the electrical power generation instruction setting device 54. For example, in the above-described embodiments, it is assumed that the permissible electrical power fluctuation rate setting device 50 is employed, but, alternatively, it is possible to employ only the permissible supply electrical power range setting device 51. That is, of the above-mentioned devices, a single device may be independently employed.

Furthermore, in the above-mentioned embodiments, the permissible electrical power fluctuation rate setting devices 50 and 50', the permissible supply electrical power range setting device 51, the target charging ratio setting device 52, the PID control constant setting device 53, and the electrical power generation instruction setting device 54 are each configured as an independent device, but, alternatively, the controller 13 may be configured so as to include the function achieved by each device.

The invention claimed is:

1. An electricity storage device being connected between an electrical power generator using natural energy for generating electricity and an electrical power system to which the electricity of the electrical power generator is supplied, and supplying electricity to the electrical power system, comprising:

a storage battery, a controller, and an electrical power inverter performing charging and discharging of the storage battery based on an inverter electrical power instruction issued by the controller, wherein the controller comprises:

a first setting portion setting a target supply electrical power based on the electrical power generation output of the electrical power generator and a charging state of the storage battery and, when a fluctuation rate deviates from a predetermined permissible electrical power fluctuation rate range, restricting the fluctuation rate of the target supply electrical power within the predetermined permissible electrical power fluctuation rate range; and a second setting portion setting an inverter target electrical power based on the target supply electrical power, wherein the predetermined permissible electrical power fluctuation rate range is changed according to a charging ratio of the storage battery, wherein the first setting portion is configured to set the target supply electrical power by using a charging-ratio-maintaining instruction to bring the charging ratio of the storage battery close to a target charging ratio; and the target charging ratio is configured to set by obtaining the target charging ratio corresponding to current time from a table, in which time and the target charging ratio are associated with each other.

2. An electricity storage device being connected between an electrical power generator using natural energy for generating electricity and an electrical power system to which the electricity of the electrical power generator is supplied, and supplying electricity to the electrical power system, comprising:

a storage battery, a controller, and an electrical power inverter performing charging and discharging of the storage battery based on an inverter electrical power instruction issued by the controller, wherein the controller comprises:

a first setting portion setting a target supply electrical power based on the electrical power generation output of the electrical power generator and a charging state of the storage battery and, when the target supply electrical power deviates from a predetermined permissible supply electrical power range, restricting the target supply electrical power within the predetermined permissible supply electrical power range; and a second setting portion setting an inverter target electrical power based on the target supply electrical power, wherein the predetermined permissible supply electrical power range is changed according to the charging ratio of the storage battery, wherein the first setting portion is configured to set the target supply electrical power by using a charging-ratio-maintaining instruction to bring the charging ratio of the storage battery close to a target charging ratio; and the target charging ratio is configured to set by obtaining the target charging ratio corresponding to current time from a table, in which time and the target charging ratio are associated with each other.

3. The electricity storage device according to claim 1, wherein the charging-ratio-maintaining instruction is obtained by PID control of the difference between the charging ratio of the storage battery and the target charging ratio; and at least one control constant used in the PID control is changed according to the charging ratio of the storage battery.

4. A hybrid distributed power supply system comprising:

the electricity storage device according to claim 1; and an electrical power generator using natural energy for generating electricity.

5. The electricity storage device according to claim 1, further comprising:

an electrical power generation instruction setting device setting a maximum electrical power generation output of the electrical power generator based on the charging ratio of the storage battery provided in the electricity storage device; and wherein the controller controls the electrical power generator based on the maximum electrical power generation output of the storage battery.

6. A method for controlling charging and discharging of an electricity storage device including a storage battery and an electrical power inverter performing charging and discharging of the storage battery based on an inverter electrical power instruction, being connected between an electrical power generator using natural energy for generating electricity and an electrical power system to which the electricity of the electrical power generator is supplied, and supplying electricity to the electrical power system from the storage battery, the method comprising:

a first setting step of setting a target supply electrical power based on the electrical power generation output of the electrical power generator and the charging state of the storage battery and, when a fluctuation rate deviates from a predetermined permissible electrical power fluctuation rate range, restricting the fluctuation rate of the target supply electrical power within the predetermined permissible electrical power fluctuation rate range; and a second setting step of setting an inverter target electrical power based on the target supply electrical power, wherein the predetermined permissible electrical power fluctuation rate range is changed according to the charging ratio of the storage battery, wherein in the first setting step, the target supply electrical power is configured to set by using a charging-ratio-maintaining instruction to bring a charging ratio of the storage battery close to a target charging ratio; and the target charging ratio is configured to set by obtaining the target charging ratio corresponding to current time from a table, in which time and the target charging ratio are associated with each other.

7. A method for controlling charging and discharging of an electricity storage device including a storage battery and an electrical power inverter performing charging and discharging of the storage battery based on an inverter electrical power instruction, being connected between an electrical power generator using natural energy for generating electricity and an electrical power system to which the electricity of the electrical power generator is supplied, and being capable of supplying electricity to the electrical power system from the storage battery, the method comprising:

a first setting step of setting a target supply electrical power based on the electrical power generation output of the electrical power generator and the charging state of the storage battery and, when the target supply electrical power deviates from a predetermined permissible supply electrical power range, restricting the target supply electrical power within the predetermined permissible supply electrical power range; and a second setting step of setting an inverter target electrical power based on the target supply electrical power, wherein the predetermined permissible supply electrical power range changes according to the charging ratio of the storage battery, wherein in the first setting step, the target supply electrical power is configured to set by using a charging-ratio-maintaining instruction to bring the charging ratio of the storage battery close to a target charging ratio; and the target charging ratio is configured to set by obtaining the target charging ratio corresponding to current time from a table, in which time and the target charging ratio are associated with each other.

8. The electricity storage device according to claim 2, wherein the charging-ratio-maintaining instruction is obtained by PID control of the difference between the charging ratio of the storage battery and the target charging ratio; and at least one control constant used in the PID control is changed according to the charging ratio of the storage battery.

9. A hybrid distributed power supply system comprising:
the electricity storage device according to claim 2; and
an electrical power generator using natural energy for generating electricity.

10. The electricity storage device according to claim 2, further comprising:

an electrical power generation instruction setting device setting a maximum electrical power generation output of the electrical power generator based on the charging ratio of the storage battery provided in the electricity storage device; wherein the controller controls the electrical power generator based on the maximum electrical power generation output of the storage battery.

* * * * *